Dec. 11, 1962   A. E. SHRUBSALL ETAL   3,068,128
FREE-PEELING SUBMERGED ARC WELDING COMPOSITION
Filed Jan. 23, 1961
Fig. 1.
SHARDS  STANDARD COMPOSITION  DEFECTS IN DEPOSIT
Fig. 2.
INVENTIVE COMPOSITION   CLEAN DEPOSIT
Fig. 3.
SHARDS   STANDARD COMPOSITION
DEFECTS IN DEPOSIT
Fig. 4.
CLEAN DEPOSIT
INVENTIVE COMPOSITION
INVENTORS
ARTHUR E. SHRUBSALL
K. WOODROW RIMER
BY Barnwell R. King
ATTORNEY

United States Patent Office 3,068,128
Patented Dec. 11, 1962

3,068,128
FREE-PEELING SUBMERGED ARC WELDING
COMPOSITION
Arthur E. Shrubsall, Niagara Falls, N.Y., and Kenneth W.
Rimer, Newark, N.J., assignors to Union Carbide Corporation, a corporation of New York
Filed Jan. 23, 1961, Ser. No. 84,402
3 Claims. (Cl. 148—26)

This invention relates to welding compositions for submerged-arc welding, and more particularly, to an improved composition for use in such welding of stainless steel.

According to the invention there is provided a fused granular submerged-melt welding composition having the following:

CHEMICAL INGREDIENTS

| | Range, percent | Preferred composition, percent |
|---|---|---|
| $Na_2SiF_6$ | 15–25 | 21.9 |
| $SiO_2$ | 30–45 | 31.6 |
| $Al_2O_3$ | 8–18 | 15.3 |
| $MgO$ | 25–35 | 26.0 |
| $Na_2CO_3$ | 0–6 | 5.2 |

The composition also may include from a trace to 5 percent $Cr_2O_3$ when desired to maintain a higher than normally available chromium level in the weld metal.

The invention also provides a process of submerged-arc welding wherein a consumable electrode is fed toward metal-work to be welded, striking the arc end of the electrode beneath a blanket of granular composition of the type defined above, thereafter leaving a readily removable or "free-peeling" fused slag on the surface of the welded work.

Prior to the present invention, satisfactory welds have been made of stainless steel with a welding composition of the type disclosed in Patent No. 2,228,639. Unfortunately, such welding composition exhibited one principal shortcoming, namely, that part which was fused during the welding operation, hereinafter called slag, did not remove cleanly from the base metal. As a result, the joint required special cleaning prior to the next weld-deposit, because any residual slag remaining on the weld tended to act as an insulator and deflected the arc, causing erratic arc action. In addition, such residual slag resisted fusion between the deposit being laid down and that already fused to the base metal, because of its inherent refractory character. Also, some slags are difficult to remove during the cleaning operation, since they become entrapped as a result of normal undercutting associated with the welding process. In the event that such entrapped slag became embedded and was not removed prior to a subsequent welding pass, the resultant welds exhibited poor mechanical properties and such defects at critical areas of the surfaces to be welded, resulted in a weakened joint and complete failure under any undue tensile force.

Slags which remain as shards on the surface of the weld are also difficult to remove. Such shards adhere very tenaciously, and upon cooling of the weld, have a tendency to "pop-off," being thereby projected at high velocity. Naturally, great danger exists to people within the immediate vicinity.

Welding economics similarly have been adversely affected by such adherent slags. It is apparent that in a multipass operation much time and effort can be expended for properly cleaning each pass and industry would be receptive to a welding composition that would eliminate such additional expense.

Attempts in the past to overcome these and other difficulties have not met with much success. A number of bonded type compositions which have at times exhibited good slag removal (free-peeling) characteristics, exhibit a series of shortcomings such as non-homogeneity and hygroscopicity which make it difficult to obtain consistent weld performance.

The main object of this invention is to provide a free-peeling submerged-arc welding composition capable of providing high quality welds with less operator effort on stainless steel and nickel-base alloys; which composition also is suitable for surfacing steel base metals with stainless steel alloys; produces a weld completely free from any deleterious residual material such as shards; and is characterized by having enough wetting action during the welding operation so as to eliminate undesirable undercutting together with slag entrapment.

Such objects are accomplished by a novel submerged-melt welding composition that is composed by weight of 15 to 25 percent $Na_2SiF_6$, 30 to 45 percent $SiO_2$, 8 to 18 percent $Al_2O_3$, 25 to 35 percent $MgO$, and 0 to 6 percent $Na_2CO_3$. The source of fluorine preferably is selected from the class of fluorides consisting of aluminum fluoride, sodium silico fluoride, magnesium silico fluoride and potassium silico fluoride. More specifically, the invention provides an improved welding composition containing 21.9 percent $Na_2SiF_6$, 31.6 percent $SiO_2$, 15.3 percent $Al_2O_3$, 26.0 percent $MgO$ and 5.2 percent $Na_2CO_3$.

In the drawings:

FIG. 1 is a top plan view (photograph) of a seam weld made according to the prior art;

FIG. 2 is a similar view of a seam weld made according to the invention;

FIG. 3 is a top plan view (photograph) of strip-electrode surfacing welds made according to the prior art; and FIG. 4 is a similar view of strip-electrode surfacing welds made according to the invention.

The welds shown in FIGS. 1 and 2 were made by the work-in-circuit submerged-melt welding process in which the arc was energized under a blanket of granular flux between the end of a metal electrode of wire and the work being welded. The improved result obtained by use of the inventive composition over that of the prior art is evident.

In our investigations in the area of obtaining an improved welding composition for stainless steel welding work was carried on initially with synthetic phlogopite mica, $(KMg_3AlSiO_3O_{10}F_2)$ a fluorine analogue of natural phlogopite $(KMg_3AlSi_3O_8)(OH)_2$. Welds made with such material upon mild steel using the submerged-arc welding process resulted in a slag which was noticeably free-peeling from the weld. Subsequent testing of the same material upon ½ in. 18–8 stainless steel plates produced good arc stability and a weld deposit of uniform contour. Unexpectantly, very little fuming took place despite the high fluorine content (13 percent) of the material.

A series of heats were made to establish the optimum range of the constituents. Table I groups the data according to composition of the fluorine component present in the welding composition. The raw constituents were placed into an arc furnace and melted. Then the resultant molten mass in each instance was cast into a chill plate and thereafter cooled, crushed, and sized to 12 mesh x D. The resultant product can be characterized as being a gray, crystalline, stony material with a micaceous fracture. In sizing the product, care had to be exercised so that not too many fines were produced due to the soft nature of the material.

Weld tests performed on the synthamica composition indicated that fluorine-base compounds form the necessary major components in a free-peeling type of welding composition. With previous welding compositions of the type as disclosed in Patents 2,200,737, and 2,228,639, it has been determined that silica is the principal cause of the tightly adhering shards of slag to the weld surface. During the welding reaction such silica combines with chromium in the plate or electrode metal to form chromium silicate of a tenacious character. The composition as described herein has equal or higher silica contents, nevertheless, with a fluorine-based component as a major constituent, a welding composition with a free-peeling slag product is obtained. From available data, it is apparent that with a 5 percent fluorine bearing compound, a free-peeling slag was not produced. However, with 10 percent or greater content of such a compound, the free-peeling characteristic was attained.

Further investigation by us indicated that the fluorine compounds were not solely responsible for the free-peeling action of the slag. A series of welds revealed that the slag adhered to the weld surface in certain instances despite the presence of fluorine. However, none of these compositions contained any predetermined amounts of alumina. Additions of alumina tend to lower the melting point or solidification temperature of the welding composition. Hence, a greater than normally available span in temperature between the solidification temperature of the weld metal and the slag is obtained. This difference, together with a vitreous character of welding composition, contributes to the elimination of the adhering shards. The temperature difference is necessary to provide for satisfactory welding performance, i.e., the slag will not tend to adhere to the weld metal because of the difference in contraction rates.

In attempting to determine a desired constituent range, a number of fluoride bearing compounds were considered. Potassium silicofluoride was initially evaluated with other fluorides substituted in whole or part for it. Those considered were sodium aluminum fluoride ($Na_3AlF_6$), sodium silicofluoride ($Na_2SiF_6$) and magnesium silicofluoride ($MgSiF_6$). Unfortunately, the welding compositions containing the magnesium silicofluoride were not successful and failure is believed to be due to the absence of alumina rather than the different form of fluoride. Further evaluation indicated that welding compositions containing potassium silicofluoride are somewhat sensitive to particle size, the preferred range being 35 mesh x D. Those welding compositions containing sodium type fluorides, however, appeared to be indifferent to sizing, operating equally as well with 12 mesh x D or 35 mesh x D.

Additions of manganese or chromium oxides did not affect the welding action or the free-peeling characteristics of the composition. As an example, the addition of 4 percent chromium oxide ($Cr_2O_3$) increased the amount of chromium recovery in the weld metal (Table IV) and yet provided a free-peeling slag. A comparison of welding results in Table II with those in Table III indicates that the slag-to-wire ratio of the inventive composition is less than that for the competitive ones and aids in improving weld economics.

Bead size and shape appeared to be dependent upon the type of fluorine compound used; the sodium bearing compounds yielded somewhat wider and more uniform deposits than that of the potassium bearing components. Where potassium silicofluoride and sodium aluminum fluoride were converted to sodium silicofluoride, additional amounts of sodium in the form of sodium carbonate were added to maintain the sodium level.

Unexpectantly, the high fluorine content of the composition did not cause objectionable fuming during the welding operation. This is believed to be caused by the fact that the fluorine is tied up in the welding composition as a complex fluorosilicate.

To further prove the value of the inventive welding composition, a flat strip electrode was used (as disclosed in Newman et al., Pat. No. 2,848,593, for example) in place of a conventional round electrode. Beads deposited with such strip electrode were from 1 in. to 1½ in. in width and were very smooth. A pad weld of several overlapping beads on mild steel plate showed a dilution of only 13 percent.

From various welds made, the welding composition provided itself adaptable to strip electrode welding, producing exceptionally good results in the case of surfacing. Dilution was found to be far less with this technique than with the round electrode. In addition, a wider surface area was able to be covered in a single pass.

FIGS. 3 and 4 illustrate such surfacing applications comparing the performance of the inventive welding composition with a prior composition. Note the shard free and clean weld-deposits of the inventive composition.

TABLE I

*Welding Composition*

| Constituents | Welding composition number | | | | | | |
|---|---|---|---|---|---|---|---|
| | 1 | 2 | 3 | 4 | 5 | 6 | 7 |
| $K_2SiF_6$ | 25.5 | 25.5 | 5.0 | 1.7 | | 1.8 | |
| $Na_3AlF_6$ | | | | 20.5 | | 18.9 | |
| $MgSiF_6$ | | | | | 39.0 | | |
| $SiO_2$ | 34.4 | 34.4 | 43.4 | 38.7 | 28.0 | 42.0 | 30.3 |
| $Al_2O_3$ | 12.1 | 12.1 | 15.5 | 8.9 | | 9.6 | 14.7 |
| $MgO$ | 28.0 | 28.0 | 35.7 | 25.8 | 33.0 | 27.7 | 25.0 |
| $MnO$ | | | | | | | |
| $Na_2SiF_6$ | | | | | | | 21.0 |
| $Cr_2O_3$ | | | | | | | 4.0 |
| $Na_2CO_3$ | | | | 4.4 | | | 5.0 |

TABLE II

*Weld Tests*

| Welding conditions | Welding composition number | | | | | | | | |
|---|---|---|---|---|---|---|---|---|---|
| | 1 | 2 | 3 | 4 | 4 | 5 | 6 | 6 | 7 |
| Plate thickness, inch | ½ | ½ | ½ | ½ | ½ | ½ | ½ | ½ | ½ |
| Type (stainless steel) | 18-8 | 18-8 | 18-8 | 18-8 | 18-8 | 18-8 | 18-8 | 18-8 | 18-8 |
| Electrode diameter, inch | 3/16 | 3/16 | 3/16 | 3/16 | 3/16 | 3/16 | 3/16 | 3/16 | 3/16 |
| Type (stainless steel) | 18-8 | 18-8 | 18-8 | 18-8 | 18-8 | 18-8 | 18-8 | 18-8 | 18-8 |
| Amperes | 600 | 600 | 600 | 525 | 640 | 650 | 560 | 640 | 650 |
| Volts | 42 | 41.5 | 40 | 45 | 43 | 37 | 45 | 43 | 37 |
| IPM | 18 | 18 | 18 | 18 | 18 | 18 | 18 | 18 | 18 |
| Power | DCRP | DCRP | DCRP | DCRP | DCRP | DCRP | DCRP | DCRP | DCRP |
| Ratio, slag/wire | 0.81 | 0.78 | 0.90 | 0.97 | 1.10 | | 0.83 | 1.10 | 0.61 |
| Remarks on slag | (1) | (1) | (2) | (1) | (1) | (3) | (1) | (1) | (1) |

[1] Free peeling.  [2] Some slag adherence.  [3] Very adherent slag.

TABLE III
Comparative Weld Tests (Surface Beads)

| Commercial product | Plate | | Electrode | | Amps. | Volts | IPM | Power | Ratio, slag/wire | Remarks |
|---|---|---|---|---|---|---|---|---|---|---|
| | Thickness in. | Type [1] | Diam. in. | Type [1] | | | | | | |
| A | ½ | 18-8 | 3/16 | 18-8 | 640 | 39 | 18 | DCRP | 1.30 | Slag adherence to edges and surface. |
| B | ½ | 18-8 | 3/16 | 18-8 | 640 | 39 | 18 | DCRP | 0.90 | Scum on weld surface very difficult to remove. |
| B | ½ | 18-8 | 3/16 | 18-8 | 600 | 40 | 18 | DCRP | 1.20 | Scum on weld surface not removable. |

[1] Stainless steel.

TABLE IV
Part A
WELD TESTS FOR DETERMINATION OF WELD METALS PROPERTIES
[18-8 Stainless Steel plate, ½" thick; 18-8 Stainless Steel rod, ¼" diameter; weld single V butt]

| Welding comp. | Welding conditions | | | | Ratio, slag/wire | Weld metal analysis | | | | |
|---|---|---|---|---|---|---|---|---|---|---|
| | Amps. | Volts | IPM | Power | | Percent C | Percent Si | Percent Mn | Percent Ni | Percent Cr |
| 4 | 850 | 30 | 18 | AC | 0.37 | 0.082 | 0.58 | 1.62 | 11.13 | 19.47 |
| 6 | 850 | 33 | 18 | AC | 0.32 | 0.092 | 0.62 | 1.56 | 11.50 | 19.22 |

Part B
WELD TESTS FOR DETERMINATION OF WELD METALS PROPERTIES
[18-8 Stainless Steel plate, ½" thick; 18-8 Stainless Steel rod, ¼" diameter; weld single V butt]

| Welding comp. | Mechanical properties | | | | | | |
|---|---|---|---|---|---|---|---|
| | Tensile Test | | | | Charpy impact test, ft. lbs. | | |
| | Yield strength, p.s.i. | Ult. strength, p.s.i. | Elongation, percent in 2 in. | Reduction of area, percent | +70° C. | −80° C. | −196° C. |
| 4 | 40,800 | 76,900 | 50.0 | 61.7 | 74 | 54 | 23 |
| 6 | 41,200 | 77,900 | 51.3 | 60.2 | 71 | 52 | 22 |

What is claimed is:

1. A fused granular submerged-melt welding composition for welding stainless steel as well as nickelbase alloys to produce high quality welds with little effort that are free of deleterious residual material such as shards, and a free-peeling slag, which composition is composed by weight of the following range of ingredients: 15–25% $Na_2SiF_6$, 30–45% $SiO_2$, 8–18% $Al_2O_3$, 25–35% MgO, trace–6% $Na_2CO_3$, and trace–5% $Cr_2O_3$.

2. A fused granular submerged-melt welding composition which is composed of 21.9% $Na_2SiF_6$, 31.6% $SiO_2$, 15.3% $Al_2O_3$, 26.0% MgO and 5.2% $Na_2CO_3$.

3. A fused granular submerged-melt welding composition for welding stainless steel as well as nickel base alloys with little effort to produce high quality welds that are free of deleterious residual material such as shards, and a free-peeling slag, which composition is composed by weight of the following ingredients: 30–45% $SiO_2$, 8–18% $Al_2O_3$, 25–35% MgO, and 15–25% fluoride compound selected from the class consisting of aluminum fluoride, sodium silico fluoride, magnesium silico fluoride and potassium silico fluoride.

References Cited in the file of this patent

UNITED STATES PATENTS 2,694,023   Hopkins _____ Nov. 9, 1954